May 17, 1966  G. H. CHAPPELL  3,251,566
BAIL-OUT DEVICE

Filed Sept. 30, 1963  2 Sheets-Sheet 1

INVENTOR.
BY Gilmore H Chappell

United States Patent Office 3,251,566
Patented May 17, 1966

3,251,566
BAIL-OUT DEVICE
Gilmore H. Chappell, 5900 Carpenter St.,
Philadelphia, Pa.
Filed Sept. 30, 1963, Ser. No. 312,543
7 Claims. (Cl. 244—31)

This invention relates to a bail-out means. More particularly, this invention relates to a means by which a person or object may descend from an aircraft either by a direct jump or with the use of an ejection seat.

More particularly, this invention contemplates the use of a balloon as the effective means in the descent.

It has been broadly known heretofore to use a balloon as a bail-out device. For example, it has been known to replace a parachute in an ordinary bail-out harness, and to inflate the balloon by manual operation of a valve so as to permit gas to flow from a tank into the balloon. The concept of filling a balloon through a valve, while suitable for inflating balloons intended for loft, has drawbacks and limitations when used in a bail-out device as is explained further below.

Furthermore, in modern aircraft where an ejection seat is used, there are further problems of a very serious nature arising from the use of parachutes as the bail-out agent in the entire assembly, as is pointed out more fully below. This invention particularly contemplates the application of a balloon with its special valving or filling means as being useful in an ejection seat.

In present high-performance aircraft in which the bail-out is effected by use of an ejection seat, there are certain inherent problems. Even though such seats may be provided to operate when the aircraft is on the ground, it still is important that certain minimum speeds be reached so that the parachute may properly inflate and permit a safe descent. At the other end of the speed spectrum, there are maximum speeds beyond which there is the danger of the parachute tearing. As is explained further below, the use of the balloon of this invention extends the upper speed limit and substantially removes the lower speed limit.

Both in the use of an ejection seat and in ordinary harness type bail-out devices, there is a final problem of collapsing and in general controlling and disposing of the chute after the landing is made. The present invention simplifies the problem of controlling the bail-out device after the landing is made. It is apparent that such improvements have great value from a safety and reliability point of view.

Because the balloon of the present invention is to be used as a bail-out device for descent only, and not for lifting, it is by no means necessary that the balloon have a volume approaching that required for lofting balloons. A large part of the effect in arresting the fall is due to the drag of the balloon, and to a large extent, the balloon itself approaches the action of a parachute of the same diameter.

It is an object of this invention to provide a bail-out device.

It is an object of this invention to provide a balloon as a bail-out device.

It is an object of this invention to provide an ejection seat bail-out device incorporating a ballooon.

It is another object of this invention to provide means for rapidly and completely unfolding and inflating a balloon as a bail-out device without imposing undue stress at any part of the balloon.

Other aims and objects of this invention are made apparent in the following specification and claims.

The invention is best understood in connection with the accompanying drawings in which like reference numerals refer to like parts and in which.

Figures 1, 2:
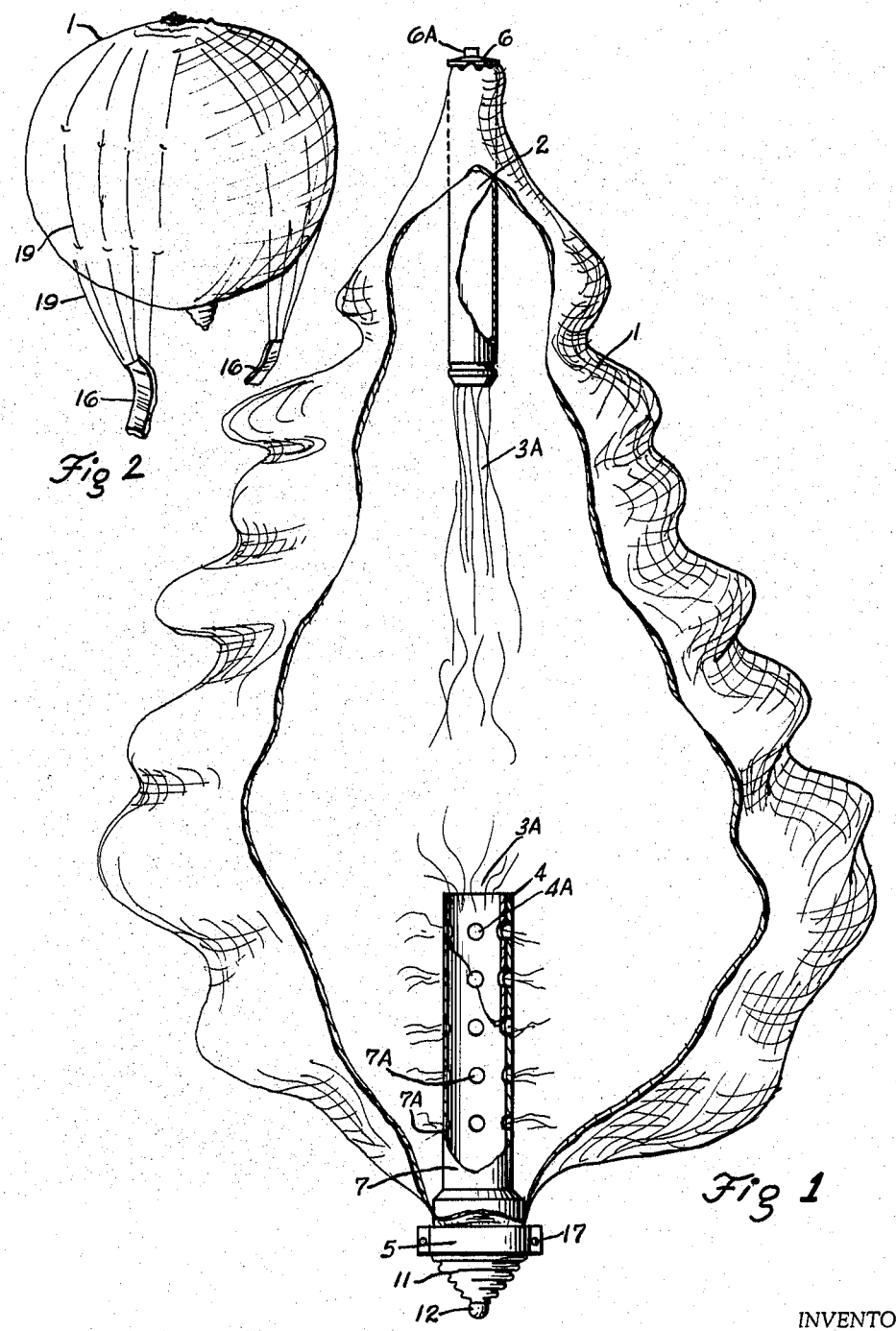
FIGURE 1 is an elevation view, partly cut away and partly in section of the bail-out device during its opening stage.
FIGURE 2 is a perspective view of the bail-out device balloon in its fully opened stage.

In ordinary parachute bail-out, there is always some degree of danger that the rush of air will not properly inflate the parachute, and aerodynamic forces are relied upon for the final opening of the chute. On landing, the proper collapsing and control of the chute is a matter of some concern, and ground winds sometimes take the chute away from the control of the jumper.

By substituting a balloon as in the present invention, several of these difficulties are overcome. The opening or inflating process is completely independent and internal, not relying upon the passage through the air, as in the case of an ordinary parachute. This alone increases the reliability of this invention as a bail-out device. Since no particular air speed is required to complete the opening of this bail-out device it is apparent no minimum speed of the aircraft is necessary, and the minimum distance of the jump is governed only by the time it takes the internal mechanism of the bail-out device to open the balloon.

The balloon itself has a strong arresting effect due to drag past its outer surface. This skin drag of air passing across the surface of the balloon is in addition to the arresting effect due solely to the horizontal plane diameter of the balloon. To a large extent, the arresting effect ascribable to this horizontal plane diameter corresponds to the arresting effect due to the horizontal plane diameter of a conventional parachute. In addition to the abovementioned arresting effects, the inflating gas is preferably one having a lifting effect in air, preferably helium. While nonlifting gases such as air may be used within the spirit of the invention, it is apparent that the use of a lifting gas has decided advantages in improving the bail-out efficiency. Also, it provides an arresting effect completely without regard to the speed of passage through the air of the device. That is, an arresting force is provided as soon as the device opens, even though there is no relative vertical motion between the jumper and the ground.

The problems concerning relative air speeds discussed above are of extreme importance when a bail-out device is incorporated in an ejection seat. It is desirable to have a means of escape from aircraft at very low altitudes or even on the ground. The standard ejection seats can operate from an aircraft on the ground, but available such seats require certain speeds so that the air speed relative to the chute may be relied upon to safely open the chute and assure a safe descent. Another limiting factor in the use of ejection seats is at very high speeds. At such speeds, the relative air speed is so great that there is a danger of tearing or fouling the chute as it opens. Because the bail-out device of the present invention does not require any relative air speed to operate, it may be used from the ground at a standstill. This bail-out device may also be used at higher speeds than are presently safe with conventional chutes, again because the opening is entirely internal, and the device does not face the problem of much higher than normal stresses on opening mechanism when the opening is at very high speeds. In fact, when this balloon opens at very high speeds, the impact of the air tends to be relatively uniformally distributed over a large tension area.

In addition, in a conventional chute, certain lines or shrouds are slack until the chute has fully opened, at which time they are subjected to a shock stress which increases radically as the relative air speed at the moment of opening increases. The same problem applies to the actual fabric of the chute. On the other hand, in the present invention, since the opening is entirely internal, the relative air speed at that moment does not have the same dangerous effect at high speeds.

A key problem solved in this invention is getting the balloon open very quickly, positively and without dangerous unbalanced stresses on any part thereof.

It is understood that this invention covers a bail-out device which may be incorporated in many different forms, as in an ejection seat, or harnesses of different types. It may be used with other standard mechanisms, such as time or altitude opening means, and safety devices.

In FIGURE 2, balloon 1 is shown in its inflated state during a descent. This showing is generalized, to indicate that the accompanying harness or other mechanism may vary within known or obvious types. Shrouds 19 are fastened to the outside of balloon 1, and are attached to harness members 16. The exact shape of the inflated balloon is not critical, and it may be more vertically elongated than is illustrated herein. Of course, a load is suspended in or from harness members 16.

In FIGURE 1, the operation of the quick-opening valving mechanism is best shown. The balloon 1 is shown partly inflated, just after the inflation step has been initiated in a manner described below. Part of the balloon 1 is cut away to more clearly show the operative mechanism. The balloon itself may be made of any well known strong flexible material. The extreme fragility and lightness of sheet materials as are commonly used in high altitude lofting balloons, such as polyethylene sheets, is not here desirable or required. The balloon may preferably be made of multi-ply nylon and synthetic rubber woven or otherwise formed in well known means to provide a tough flexible sheet.

A canister means is provided. This canister means comprises inner shell 2, outer shell 4, and housing shell 7. In the condition of the bail-out device before inflation starts, inner shell 2 nests within outer shell 4, and the space inclosed within inner shell 2 and the space within inner shell 2 is sealed. The details are best described below in connection with FIGURE 3. The shells 2, 4, and 7, together with the other means completing the creation of a pressure tight space within inner shell 2 are together considered the canister means. The canister means is initially charged with compressed gas, preferably helium.

In the condition shown in FIGURE 1, inner shell 2 has been released from its locking engagement to outer shell 4. The pressure of the gas within shell 2 has then served to drive shell 2 out of its nesting relationship with outer shell 4.

A plurality of holes 7A are provided in registered relationship through both outer shell 4 and housing shell 7. As the contained gas pressure drives inner shell 2 out of its nesting relationship, the lower edge of inner shell 2 overrides the holes 7A in succession. The escaping compressed gas 3A escapes from the canister means into the general interior of balloon 1 by the open top of outer shell 4, from the end of inner shell 2, and successively through the successively exposed holes 7A.

The balloon 1 is affixed in a sealed manner to the top of inner shell 2 by means of upper fastening means. This upper fastening means comprises a top clamp 6 and a retaining means 6A which preferably is a threaded bolt. The escaping gas 3A leaving inner shell 2 provides a reaction motor effect, causing shell 2 to rise. The initial "rocket" action unfolds and deploys the compactly folded balloon 1. The stresses of this sudden opening are distributed over the whole area of the balloon, reaching the greatest concentration where the fabric or sheet of the balloon is joined to the shell. Even this relatively high stress area provides less stress concentration than is available in conventional chutes. Thus, the first desirable step of very rapid deployment of the balloon is effected.

At the same time, the initial burst of escaping gas is not sharply directed against any one area of the balloon fabric. This avoids dangerous high stress concentrations due to the blast of gas. However, a second desirable attribute is that the entire volume of gas within the canister means be distributed to the general interior of the balloon as quickly as possible. The continuing additional exposure of holes 7A facilitates this desirable rapid distribution, and when inner shell 2 has cleared the top of outer shell 4, the open top of outer shell 4 is also a source for distribution. The paths of the escaping gas 3A are shown by the fine lines in FIGURE 1. Thus, the gas pressure serves to quickly deploy the balloon, to quickly inflate it, and because of the various sources for the flow of compressed gas, it prevents any excessive blast of gas pressure against any one part of the balloon fabric.

The amount and pressure of gas included is a matter of engineering choice depending upon the exact size of the bail-out device, conditions of use, etc.

Figure 3:
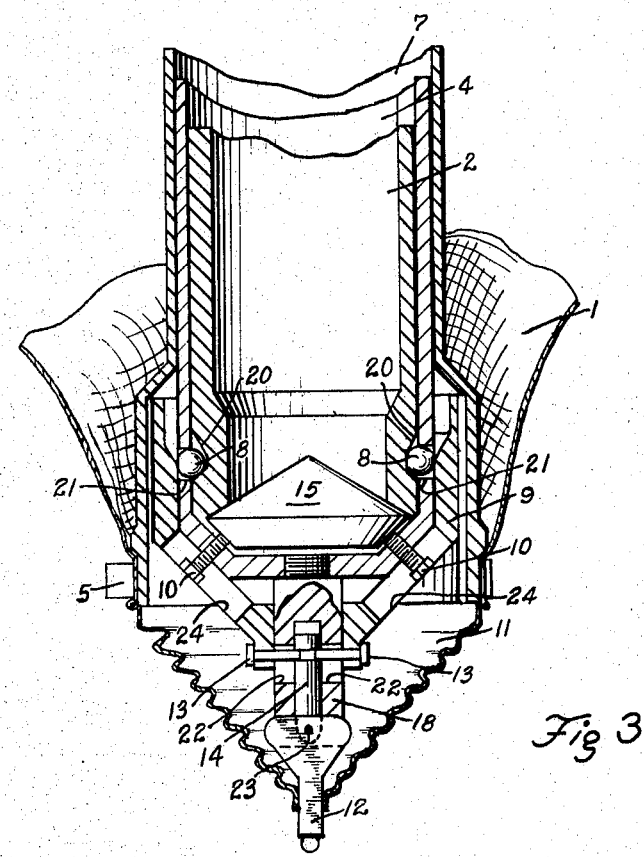
FIGURE 3 is an elevation view in cross-section of part of the valving mechanism.

The means for effectuating the locking of the shells is best shown in FIGURE 3. This figure shows the lower balloon fastening means, the canister locking means and the canister unlocking means. The inner shell 2 is provided with recesses 20 on the outer surface thereof near the lower end. In this particular embodiment, these recesses are combined into one continuous channel circumferentially around the outer surface of inner shell 2. Into the recess 20 is fitted at least one ball bearing 8, whose diameter is such that it extends beyond the outer surface of inner shell 2. Outer shell 4 is provided with at least one locking hole 21. Each such locking hole is registered with a ball bearing 8. As shown, the fit between inner shell 2 and outer shell 4 is a close though sliding fit, and as is shown in FIGURE 3, the registration of ball bearings 8 and corresponding locking holes 21 serves to retain or lock the inner shell 2 within the outer shell 4 provided that the ball bearings 8 are restrained from moving axially outwardly.

The ball bearing is retained in its recess 20 by means of cap 9. This cap 9 fits outside the lower portion of outer shell 4, and within the lower portion of housing shell 7, which is flaired outwardly to receive the cap 9. The internal diameter of cap 9 is such that it makes a close but sliding fit with the outer surface of outer shell 4, except that toward the upper edge of cap 9, its internal diameter is increased, as shown in FIGURE 3. In the locked position illustrated in FIGURE 3, it is apparent that cap 9 prevents the ball bearings 8 from movement outward from the center line of the shells, and thus the shells are effectively locked together.

A block 18 is rigidly affixed to the lower end of outer shell 4, as by the threaded stud as shown. This block 18 is provided with a transverse slot 22 therein. A yoke shaft 14 is mounted vertically through a hole provided in block 18 to receive it. Yoke shaft 14 moves within the matching hole in block 18 with a sliding fit, and the hole is extended so as to provide a suitable degree of axial freedom for yoke shaft 14. A yoke pin 13 is transversely affixed to yoke shaft 14, and is positioned through slot 22.

The cap 9 is extended below the lower end of outer shell 4 and is affixed to yoke pin 13 as shown. An operating lever 12 is pivotally affixed to the bottom end of yoke shaft 14 at pivot 23. As shown, the upper portion of operating lever 12 is expanded to form a camming surface. When the lower extending portion of operating lever 12 is moved to the right or left in the plane of the drawing, its upper camming surface, bearing against the lower side of block 18, acts to draw down yoke shaft 14. This in turn draws down cap 9.

When cap 9 is drawn down, ball bearings 8 are free to move outwardly into the cutaway portion as has been described. The recesses 20 in which the ball bearings 8 rest are provided with angled sides as shown. When the cap 9 is drawn down, the force of the compressed gas within inner shell 2, acting on the ends of the shell, tends to pull the shell to outer shell 4, and this force is transmitted through the angled sides of recesses 20, and tends to move ball bearings 8 outwardly. This sequence unlocks the bail-out device, and inner shell 2 is propelled toward the state illustrated in FIGURE 1, as has been described above.

A sealing block 15 is provided within outer shell 4 at the bottom thereof, to seal against the lower edge of inner shell 2. This sealing block 15 is seated on adjusting screws 10. The adjusting screws 10 in turn rest on pillow block 24. Pillow block 24 is normally a continuous circumferential inwardly angled piece affixed to the inside of the bottom of housing shell 7.

The purpose of providing the adjusting screws 10 is so that during initial assembly of the device, the sealing block 15 may be accurately positioned to insure a pressure-tight fit. Slots having appropriate clearance are provided in cap 9 to accommodate the adjusting screws 10. The exact structure of sealing block 15 may vary depending upon engineering considerations. For example, it may consist wholly or in part of resilient material such as neoprene, or it may be provided with any known gasket.

A flexible protective cover 11 is provided below the lower edge of the shells, to generally contain the unlocking mechansm.

An important function of the housing shell 7 is to provide means for securing the lower edge of balloon 1. While this housing shell 7 is shown as coextensive with inner shell 4, it may be substantially shorter. The lower edge of balloon 1 fits around the lower part of housing shell 7, and is retained there by means of a clamp 5. The clamp 5 is a circumferential band which squeezes balloon 1 between itself and housing 7 in a pressure-tight manner. As best shown in FIGURE 1, the clamp 5 may be a split ring, having a pair of holding means 17. These holding means may be bolts.

After landing, it is desirable to have a means for effecting a quick dumping or discharge of gas from the balloon so that a quick collapse may be had. This is a desirable control aspect that is lacking in conventional chutes. The preferred way of quick dumping is to completely open the seal at the upper or lower end of balloon 1. For example, instead of holding means 17 comprising conventional threaded bolts, it may be a toggle or other quick latch and unlatch device. Thus, when landing, the operator may strike or otherwise operate holding means 17 so as to release clamp 5. The lower edge of balloon 1 will then lose its gas-tight seal against housing 7, and the gas may escape. The same action may be effected at the upper edge, at which point retaining means 6A, instead of being a conventional bolt, can be a quick release mechanism so that clamp 6 is relieved from its clamping pressure against the top edge of balloon 1.

It is apparent that the operating lever 12 may be manually operated either directly or by some intermediate means as a lanyard. It may be automatically operated, as by a pressure or time device. It may have a combination of manual and automatic operating mechanisms in connection with it. Safety and cocking devices may also be incorporated with operating lever 12, all of these things being known in other bail-out devices.

The scope of this invention is to be determined by the appended claims and is not to be limited by the foregoing description and drawings which are intended to be illustrative.

I claim:
1. A bail-out device comprising a collapsed balloon, a canister means at least partly inside said balloon, said balloon having an opening therein, said opening having edges, lower fastening means on said canister means contacting said balloon near said edges to seal said opening and affix said balloon to said canister, compressed gas sealed within said canister means, said canister means comprising an inner shell and an outer shell, and said balloon also being affixed to said inner shell at a place on said balloon diametrically opposed to the place where said edges are fastened to said lower balloon fastening means, and a locking and unlocking means operable from outside said balloon, whereby said canister may be rapidly opened.

2. A bail-out device as set forth in claim 1 wherein said lower fastening means comprises a housing shell affixed to said canister, and a clamp, said clamp holding said edges of said balloon opening in a sealed relation against said housing shell.

3. A bail-out device as set forth in claim 1 wherein said locking and unlocking means comprises a recess in said inner shell, a locking hole in said outer shell, a detent in said recess and said locking hole, and a cap outside said outer shell, said cap being selectively movable with respect to said outer shell, said movement selectively retaining said detent, or permitting it to move outwardly.

4. A bail-out device as set forth in claim 1 wherein said inner shell fits closely but slidably within said outer shell, and said outer shell is provided with a plurality of holes.

5. A bail-out device comprising a balloon, canister means at least partly inside said balloon and filled with compressed lighter-than-air gas, said canister means comprising an outer shell and an inner shell fitting closely but slidably within said outer shell, said outer shell being open at the top thereof, said balloon being affixed to said inner shell, a plurality of holes through said outer shell, said inner shell having an open end, a sealing block inside said outer shell, said open end of said inner shell resting against said sealing block, locking means to hold said inner shell from sliding against said outer shell, and an operating lever to unlock said locking means.

6. A bail-out device as set forth in claim 5 wherein said balloon has at least one opening therein, a clamp, said clamp sealably holding said balloon opening against said canister means, clamp holding means on said clamp, said clamp holding means being releasable, whereby said balloon opening may be unsealed.

7. A bail-out device as set forth in claim 5 wherein said inner shell is affixed to said balloon by an upper fastening means, said upper fastening means comprising a clamp and a clamp retaining means, said balloon having an aperture with edges, said clamp sealing said aperture edges against said inner shell, and said clamp retaining means being quickly releasable whereby said aperture may be opened.

References Cited by the Examiner

UNITED STATES PATENTS 2,646,019  7/1953  Chetlan _____ 9—9 X
3,072,372  1/1963  Lowry _____ 244—147 X MILTON BUCHLER, *Primary Examiner.*

FERGUS S. MIDDLETON, *Examiner.*

R. G. BESHA, T. MAJOR, *Assistant Examiners.*